(12) United States Patent
Ieki et al.

(10) Patent No.: US 9,460,320 B2
(45) Date of Patent: Oct. 4, 2016

(54) TRANSCEIVER AND RADIO FREQUENCY IDENTIFICATION TAG READER

(75) Inventors: Tsutomu Ieki, Nagaokakyo (JP); Ken Sakai, Nagaokakyo (JP); Noboru Kato, Nagaokakyo (JP); Koji Shiroki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 195 days.

(21) Appl. No.: 13/437,978

(22) Filed: Apr. 3, 2012

(65) Prior Publication Data

US 2012/0190310 A1 Jul. 26, 2012

Related U.S. Application Data

(63) Continuation of application No. PCT/JP2010/066291, filed on Sep. 21, 2010.

(30) Foreign Application Priority Data

Oct. 27, 2009 (JP) ................................. 2009-246199

(51) Int. Cl.
*H04B 1/38* (2015.01)
*G06K 7/00* (2006.01)
(Continued)

(52) U.S. Cl.
CPC ......... *G06K 7/0008* (2013.01); *G06K 7/10316* (2013.01); *H01Q 1/2283* (2013.01); *H01Q 25/001* (2013.01)

(58) Field of Classification Search
CPC ........ H04B 1/401; H04B 7/066; H04B 1/56; H01Q 1/36; H01Q 25/001; H01Q 25/005
USPC ............ 455/73, 80, 126, 269, 572; 343/730, 343/848
See application file for complete search history.

(56) References Cited

U.S. PATENT DOCUMENTS

| 3,364,564 A | 1/1968 | Kurtz et al. |
| 4,794,397 A | 12/1988 | Ohe et al. |

(Continued)

FOREIGN PATENT DOCUMENTS

| CA | 2 279 176 A1 | 7/1998 |
| DE | 100 25 992 A1 | 1/2002 |

(Continued)

OTHER PUBLICATIONS

Official communication issued in Japanese Application No. 2007-531524, mailed on Sep. 11, 2007.

(Continued)

*Primary Examiner* — Wesley Kim
*Assistant Examiner* — Raj Chakraborty
(74) *Attorney, Agent, or Firm* — Keating & Bennett, LLP

(57) ABSTRACT

In a transceiver, on a top surface of a rectangular plate-shaped substrate, transmission radiating elements and receiving radiating elements are provided. The transmission radiating elements extend in the horizontal or lateral direction from the center of the substrate. The receiving radiating elements extend in the vertical or longitudinal direction from the center of the substrate. Inductors included in a matching feeding element are individually electromagnetically coupled to transmission-side feeding points that are inner end portions of the transmission radiating elements and receiving-side feeding points that are inner end portions of the receiving radiating elements. A transmission signal is transmitted with a wave polarized in the horizontal or lateral direction, and a signal having a vertical or longitudinal polarization direction is received.

15 Claims, 7 Drawing Sheets

(51) Int. Cl.
   *G06K 7/10*       (2006.01)
   *H01Q 1/22*       (2006.01)
   *H01Q 25/00*      (2006.01)

(56) References Cited

U.S. PATENT DOCUMENTS

| | | | |
|---|---|---|---|
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,375,256 A * | 12/1994 | Yokoyama | H01Q 1/244 333/129 |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,243,045 B1 | 6/2001 | Ishibashi | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,452,563 B1 | 9/2002 | Porte | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,956,481 B1 | 10/2005 | Cole | |
| 6,963,729 B2 | 11/2005 | Uozumi | |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0164864 A1 * | 8/2004 | Chung et al. | 340/572.7 |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0032926 A1 | 2/2006 | Baba et al. | |
| 2006/0044192 A1 | 3/2006 | Egbert | |
| 2006/0055531 A1 | 3/2006 | Cook et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244568 A1 | 11/2006 | Tong et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0200782 A1 | 8/2007 | Hayama et al. | |
| 2007/0229276 A1 | 10/2007 | Yamagajo et al. | |
| 2007/0247387 A1 | 10/2007 | Kubo et al. | |
| 2007/0252700 A1 | 11/2007 | Ishihara et al. | |
| 2007/0252703 A1 | 11/2007 | Kato et al. | |
| 2007/0285335 A1 | 12/2007 | Bungo et al. | |
| 2007/0290928 A1 | 12/2007 | Chang et al. | |
| 2008/0024156 A1 | 1/2008 | Arai et al. | |
| 2008/0068132 A1 | 3/2008 | Kayanakis et al. | |
| 2008/0070003 A1 | 3/2008 | Nakatani et al. | |
| 2008/0087990 A1 | 4/2008 | Kato et al. | |
| 2008/0143630 A1 | 6/2008 | Kato et al. | |
| 2008/0146144 A1 * | 6/2008 | Rofougaran | 455/3.02 |
| 2008/0169905 A1 | 7/2008 | Slatter | |
| 2008/0184281 A1 | 7/2008 | Ashizaki et al. | |
| 2008/0272885 A1 | 11/2008 | Atherton | |
| 2008/0280574 A1 * | 11/2008 | Rofougaran | H01Q 3/26 455/126 |
| 2009/0002130 A1 | 1/2009 | Kato | |
| 2009/0009007 A1 | 1/2009 | Kato et al. | |
| 2009/0021352 A1 | 1/2009 | Kataya et al. | |
| 2009/0021446 A1 | 1/2009 | Kataya et al. | |
| 2009/0065594 A1 | 3/2009 | Kato et al. | |
| 2009/0088114 A1 * | 4/2009 | Yoshida et al. | 455/269 |
| 2009/0109102 A1 | 4/2009 | Dokai et al. | |
| 2009/0160719 A1 | 6/2009 | Kato et al. | |
| 2009/0201116 A1 | 8/2009 | Orihara | |
| 2009/0224061 A1 | 9/2009 | Kato et al. | |
| 2009/0231106 A1 | 9/2009 | Okamura | |
| 2009/0262041 A1 | 10/2009 | Ikemoto et al. | |
| 2009/0266900 A1 | 10/2009 | Ikemoto et al. | |
| 2009/0278687 A1 | 11/2009 | Kato | |
| 2009/0321527 A1 | 12/2009 | Kato et al. | |
| 2010/0103058 A1 | 4/2010 | Kato et al. | |
| 2010/0103061 A1 * | 4/2010 | Yung | H01Q 7/00 343/730 |
| 2010/0123640 A1 * | 5/2010 | Hui et al. | 343/848 |
| 2010/0130264 A1 * | 5/2010 | Yong | H04B 7/10 455/572 |
| 2010/0182210 A1 | 7/2010 | Ryou et al. | |

(56) References Cited

U.S. PATENT DOCUMENTS

| | | |
|---|---|---|
| 2010/0308118 A1 | 12/2010 | Kataya et al. |
| 2011/0031320 A1 | 2/2011 | Kato et al. |
| 2011/0063184 A1 | 3/2011 | Furumura et al. |

FOREIGN PATENT DOCUMENTS

| | | |
|---|---|---|
| DE | 10 2006 057 369 A1 | 6/2008 |
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| GB | 2 305 075 A | 3/1997 |
| GB | 2461443 A | 1/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 07-231217 A | 8/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-093029 A | 4/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 9-512367 A | 12/1997 |
| JP | 10-69533 A | 3/1998 |
| JP | 10-069533 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-055032 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-240217 A | 9/2001 |
| JP | 2001-256457 A | 9/2001 |

(56) References Cited

FOREIGN PATENT DOCUMENTS

| | | |
|---|---|---|
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-126750 A | 4/2004 |
| JP | 2004-127230 A | 4/2004 |
| JP | 2004-140513 A | 5/2004 |
| JP | 2004-163134 A | 6/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |

(56) References Cited

FOREIGN PATENT DOCUMENTS

| | | |
|---|---|---|
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-013976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 2007-172369 A | 7/2007 |
| JP | 2007-172527 A | 7/2007 |
| JP | 2007-228254 A | 9/2007 |
| JP | 2007-228325 A | 9/2007 |
| JP | 2007-233597 A | 9/2007 |
| JP | 2007-266999 A | 10/2007 |
| JP | 2007-272264 A | 10/2007 |
| JP | 2007-287128 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160874 A | 7/2008 |
| JP | 2008-167190 A | 7/2008 |
| JP | 2008-197714 A | 8/2008 |
| JP | 2008-535372 A | 8/2008 |
| JP | 2008-207875 A | 9/2008 |
| JP | 2008-217406 A | 9/2008 |
| JP | 2008-288915 A | 11/2008 |
| JP | 2009-017284 A | 1/2009 |
| JP | 2009-25870 A | 2/2009 |
| JP | 2009-27291 A | 2/2009 |
| JP | 2009-044647 A | 2/2009 |
| JP | 2009-044715 A | 2/2009 |
| JP | 3148168 U | 2/2009 |
| JP | 2009-110144 A | 5/2009 |
| JP | 2009-153166 A | 7/2009 |
| JP | 2009-182630 A | 8/2009 |
| JP | 2010-009196 A | 1/2010 |
| JP | 2010-081571 | 4/2010 |
| JP | 4609604 B2 | 1/2011 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/022404 A1 | 2/2009 |

(56) References Cited

FOREIGN PATENT DOCUMENTS

| WO | 2009/081719 A1 | 7/2009 |
|---|---|---|
| WO | 2009/110381 A1 | 9/2009 |
| WO | 2009/119548 A1 | 10/2009 |
| WO | 2009/128437 A1 | 10/2009 |
| WO | 2010/026939 A1 | 3/2010 |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290; filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication Issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electonic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672 filed Oct. 15, 2009.

(56) References Cited

OTHER PUBLICATIONS

Official communication issued in International Application No. PCT/JP2008/058614, mailed on Jun. 10, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.

(56) References Cited

OTHER PUBLICATIONS

Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.

\* cited by examiner

TRANSCEIVER AND RADIO FREQUENCY IDENTIFICATION TAG READER

BACKGROUND OF THE INVENTION

1. Field of the Invention

The present invention relates to transceivers, and, more particularly, to a radio frequency identification tag reader used in an RFID (Radio Frequency Identification) system.

2. Description of the Related Art

Japanese Unexamined Patent Application Publication No. 2007-228254 and Japanese Unexamined Patent Application Publication No. 2006-238282 disclose radio frequency identification tag readers.

Japanese Unexamined Patent Application Publication No. 2007-228254 discloses a radio frequency identification tag reader including a circulator with which an antenna is shared for transmission and reception.

FIG. 1 is an overall schematic view of a radio frequency identification tag communication system disclosed in Japanese Unexamined Patent Application Publication No. 2007-228254. Referring to FIG. 1, a radio frequency identification tag communication system S includes an interrogator 100 and radio frequency identification tags T that are transponders for the interrogator 100. The radio frequency identification tag T includes a radio frequency identification tag circuit element To including an antenna 51 and an IC circuit 52. The interrogator 100 includes an antenna 1 for transmitting/receiving a signal to/from the antenna 51 included in the radio frequency identification tag circuit element To by radio communication, a high-frequency circuit 2 for accessing the IC circuit 52 included in the radio frequency identification tag circuit element To via the antenna 1 (performing reading or writing on the IC circuit 52), a signal processing circuit 3 for processing a signal read from the radio frequency identification tag circuit element To, and a control circuit 4.

Japanese Unexamined Patent Application Publication No. 2006-238282 discloses a radio frequency identification tag reader that uses different antennas (a transmission antenna and a receiving antenna) for transmission and reception.

However, when a circulator is used as disclosed in Japanese Unexamined Patent Application Publication No. 2007-228254, a transceiver is increased in size. On the other hand, when a transmission antenna and a receiving antenna are separately provided as disclosed in Japanese Unexamined Patent Application Publication No. 2006-238282, a predetermined spacing between these antennas is required to achieve the isolation between them and a transceiver is increased in size.

SUMMARY OF THE INVENTION

Preferred embodiments of the present invention provide a small transceiver capable of achieving isolation between a transmission side and a receiving side without using a circulator and a radio frequency identification tag reader including the transceiver.

A transceiver according to a preferred embodiment of the present invention includes a transmission radiating element that includes a feeding point and transmits a transmission signal in a first polarization direction, a receiving radiating element that includes a feeding point and receives a receiving signal in a second polarization direction orthogonal to or substantially orthogonal to the first polarization direction, a transmission feeding circuit coupled to the feeding point of the transmission radiating element, and a receiving feeding circuit coupled to the feeding point of the receiving radiating element.

The transmission radiating element and the receiving radiating element overlap so that the transmission radiating element and the receiving radiating element are orthogonal or substantially orthogonal to each other.

For example, the feeding point of the transmission radiating element and the transmission feeding circuit are electromagnetically coupled to each other, and the feeding point of the receiving radiating element and the receiving feeding circuit are electromagnetically coupled to each other.

For example, the transceiver further includes a transmission matching circuit connected to the transmission feeding circuit. For example, the transmission radiating element, the transmission feeding circuit, and the transmission matching circuit define a transmission antenna apparatus, and a frequency band in which a gain of the transmission antenna apparatus is obtained is determined by the transmission matching circuit.

For example, the transceiver further includes a receiving matching circuit connected to the receiving feeding circuit. For example, the receiving radiating element, the receiving feeding circuit, and the receiving matching circuit define a receiving antenna apparatus, and a frequency band in which a gain of the receiving antenna apparatus is obtained is determined by the receiving matching circuit.

For example, the transmission radiating element and the transmission feeding circuit define a transmission antenna apparatus, and a frequency band in which a gain of the transmission antenna apparatus is obtained is determined by the transmission feeding circuit.

For example, the receiving radiating element and the receiving feeding circuit define a receiving antenna apparatus, and a frequency band in which a gain of the receiving antenna apparatus is obtained is determined by the receiving feeding circuit.

For example, the transmission radiating element and the receiving radiating element are electric field emission-type radiating elements.

For example, the transmission radiating elements define a dipole antenna having two feeding points, the receiving radiating elements define a dipole antenna having two feeding points, and the transmission radiating elements and the receiving radiating elements are disposed so that the transmission radiating elements and the receiving radiating elements radially extend from the feeding points.

For example, one of the transmission radiating element and the receiving radiating element is an electric field emission-type radiating element, and the other one of the transmission radiating element and the receiving radiating element is a magnetic field emission-type radiating element.

For example, the transmission radiating element and the receiving radiating element are magnetic field emission-type radiating elements.

For example, the transmission radiating element and the receiving radiating element are loop-shaped antennas located at a substrate, and one of the transmission radiating element and the receiving radiating element defines a loop along with a via electrode disposed in the substrate.

A radio frequency identification tag reader according to a preferred embodiment of the present invention includes the transceiver. A communication target of the transceiver is a radio frequency identification tag including an integrated circuit to store information and an antenna to transmit information stored in the integrated circuit or receive information to be stored in the integrated circuit. The radio frequency identification tag includes a transmission signal generator configured to generate the transmission signal and a receiving signal processor configured to acquire information about the radio frequency identification tag from the receiving signal.

Since the isolation between a transmission side and a receiving side can be achieved with no circulator, a transceiver can be reduced in size.

Since there is no loss caused by a circulator or a directional coupler, a communication range in which communication with a radio frequency identification tag is available can be increased. When there is no need to increase a communication range, power consumption can be reduced by reducing transmission power.

Since a frequency band in which the gain of an antenna apparatus is obtained is determined by a matching circuit connected to a feeding circuit or a frequency band in which the gain of an antenna apparatus is obtained is determined by a feeding circuit, a transmission signal and a receiving signal are not changed regardless of the size and shape of a radiation plate. Accordingly, a transceiver can be further reduced in size.

Since transmission radiating elements define a dipole antenna having two feeding points, receiving radiating elements define a dipole antenna having two feeding points, and the transmission radiating elements and the receiving radiating elements are disposed to radially extend from the feeding points, the feeding points can be located in the center. This provides a simple feeding structure.

Since one of a transmission radiating element and a receiving radiating element is an electric field emission-type radiating element and the other one of them is a magnetic field emission-type radiating element, optimum communication can be performed in accordance with a distance from a communication (transmission/receiving) target.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
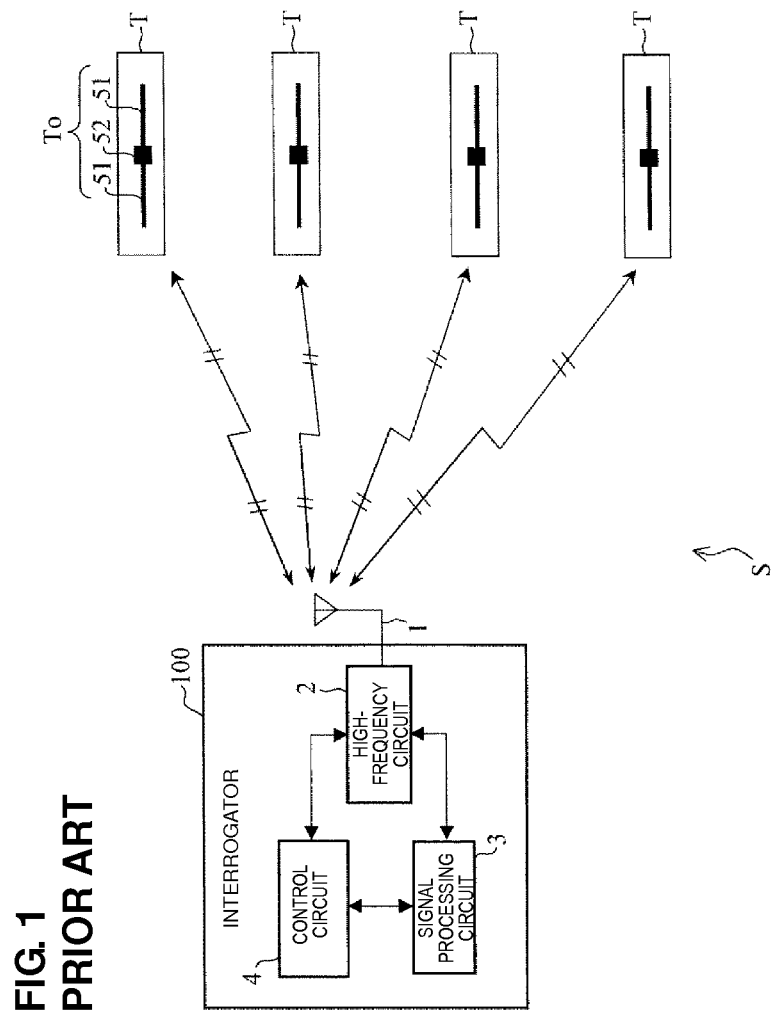
FIG. 1 is an overall schematic view of a radio frequency identification tag communication system disclosed in Japanese Unexamined Patent Application Publication No. 2007-228254.
Figure 2:
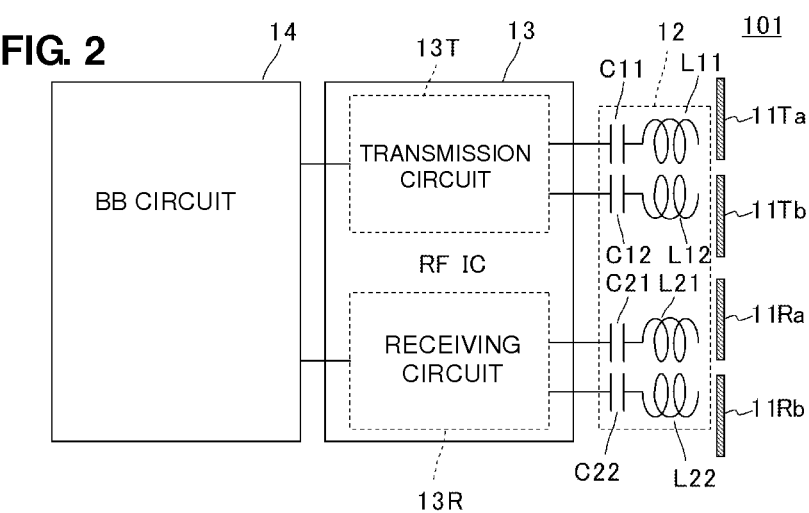
FIG. 2 is a block diagram of a radio frequency identification tag reader 101 according to a first preferred embodiment of the present invention.

FIG. 2 is a block diagram of a radio frequency identification tag reader 101 according to the first preferred embodiment of the present invention.

The radio frequency identification tag reader 101 includes a baseband circuit 14, a transmission/receiving circuit 13, a matching feeding element 12, transmission radiating elements 11Ta and 11Tb, and receiving radiating elements 11Ra and 11Rb.

The transmission/receiving circuit 13 includes a transmission circuit 13T and a receiving circuit 13R. The transmission circuit 13T amplifies the power of a transmission signal output from the baseband circuit 14 and supplies the transmission signal to the matching feeding element 12. The receiving circuit 13R outputs a receiving signal received via the matching feeding element 12 to the baseband circuit 14. The transmission/receiving circuit 13 includes a radio frequency IC chip (RFIC).

In this example, the matching feeding element 12 functions both as a matching circuit to achieve matching between the transmission circuit 13T and each of the transmission radiating elements 11Ta and 11Tb and as a matching circuit to achieve matching between the receiving circuit 13R and each of the receiving radiating elements 11Ra and 11Rb. Furthermore, the matching feeding element 12 also has a filtering function of suppressing an out-of-band interfering wave. The matching feeding element 12 preferably includes inductors L11, L12, L21, and L22 and capacitors C11, C12, C21, and C22. The inductors L11 and L12 are used to achieve electromagnetic coupling to the transmission radiating elements 11Ta and 11Tb, respectively. The inductors L21 and L22 are used to achieve electromagnetic coupling to the receiving radiating elements 11Ra and 11Rb, respectively. In this example, a balanced feeding circuit including two capacitors C11 and C12 and two inductors L11 and L12 and a balanced feeding circuit including two capacitors C21 and C22 and two inductors L21 and L22 are provided.

Figure 3A:
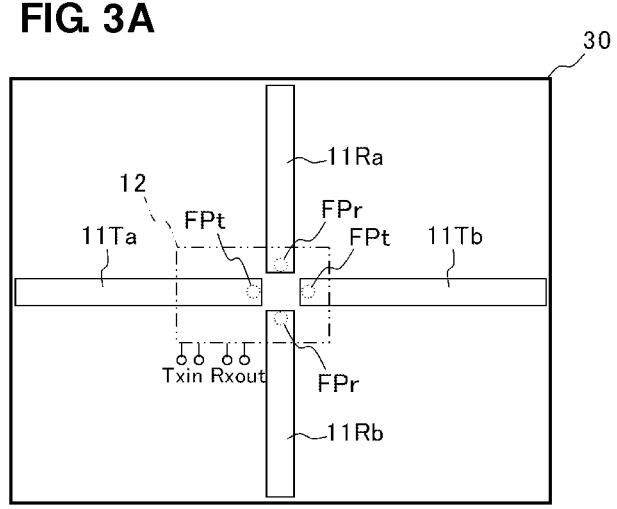
FIGS. 3A and 3B are a plan view and an elevational view, respectively, illustrating the shapes of transmission radiating elements 11Ta and 11Tb and receiving radiating elements 11Ra and 11Rb and the positions of feeding points.
Figure 3B:
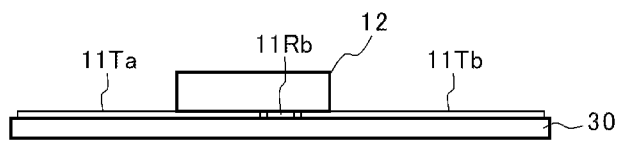

FIGS. 3A and 3B are a plan view and an elevational view, respectively, illustrating the shapes of the transmission radiating elements 11Ta and 11Tb and the receiving radiating elements 11Ra and 11Rb and the positions of feeding points. Referring to FIG. 3A, a position at which the matching feeding element 12 is disposed is represented by a two-dot chain line.

In this example, on the top surface of a rectangular plate-shaped substrate 30, the transmission radiating elements 11Ta and 11Tb and the receiving radiating elements 11Ra and 11Rb are provided. The transmission radiating elements 11Ta and 11Tb extend in the horizontal, or lateral direction from the center of the substrate 30. The receiving radiating elements 11Ra and 11Rb extend in the vertical, or longitudinal direction from the center of the substrate 30.

The inner end portions of the transmission radiating elements 11Ta and 11Tb are used as transmission-side feeding points FPt. The inner end portions of the receiving radiating elements 11Ra and 11Rb are used as receiving-side feeding points FPr. The inductors L11 and L12 are electromagnetically coupled to the transmission-side feeding points FPt, and the inductors L21 and L22 are electromagnetically coupled to the receiving-side feeding points FPr.

Since the transmission radiating elements 11Ta and 11Tb are subjected to balanced feeding from the matching feeding element 12, the transmission radiating elements 11Ta and 11Tb operate as a linear polarization dipole antenna. The receiving radiating elements 11Ra and 11Rb operate as a dipole antenna to receive a second linearly polarized signal whose direction is orthogonal to the linear polarization direction of the dipole antenna defined by the transmission radiating elements 11Ta and 11Tb.

Terminals Txin and Rxout of the matching feeding element 12 are connected to a radio frequency IC chip (not illustrated). For example, the radio frequency IC chip is mounted on the top surface of the matching feeding element 12.

A transmission signal is transmitted with a wave polarized in the horizontal, or lateral direction (a first polarization direction), and a receiving signal having a vertical, or longitudinal polarization direction a second polarization direction orthogonal to the first polarization direction) is received. That is, since the transmission signal and the receiving signal are orthogonal to each other, the isolation between them is achieved.

In the example illustrated in FIG. 3, different dimensions of radiation elements (e.g., different lengths of sides) are obtained in excitation directions of a transmission wave and a receiving wave. The reason for this is that a dimension in the excitation direction of a transmission wave and a dimension in the excitation direction of a receiving wave are determined in accordance with a transmission frequency and a receiving frequency that are different from each other. By setting the above-described dimension ratio, the gain of a transmission antenna and the gain of a receiving antenna can be made uniform.

Thus, since two antennas can be used in a limited footprint without a circulator, a small transceiver can be obtained.

The two inductors L11 and L12 in the matching feeding element 12 illustrated in FIG. 2 have opposite winding directions, and are therefore magnetically coupled to each other. Accordingly, magnetic fields generated at the two inductors L11 and L12 cancel each other, an electrode length required for the acquisition of a desired inductance value is increased, and the Q value is reduced. That is, the steepness of a resonance characteristic is reduced, and the frequency band can be therefore widened around the resonant frequency. The two inductors L21 and L22 also have opposite winding directions, and are therefore magnetically coupled to each other. Accordingly, like in the case of a transmission signal, in the case of a receiving signal, the frequency band can be widened around the resonant frequency.

Thus, even when the resonant frequencies of the radiating elements 11Ta, 11Tb, 11Ra, and 11Rb are higher than a usable frequency, that is, when the radiating elements do not have appropriate electrical lengths for a usable frequency, the matching between the transmission circuit 13T and each of the transmission radiating elements 11Ta and 11Tb and the matching between the receiving circuit 13R and each of the receiving radiating elements 11Ra and 11Rb are achieved. Accordingly, since the radiating elements have only to be large enough to obtain a predetermined gain, the entire size can be reduced.

Second Preferred Embodiment

Figure 4A:
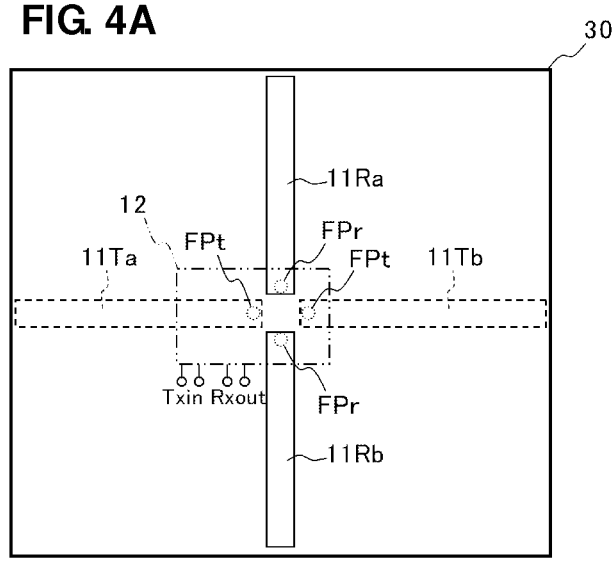
FIGS. 4A and 4B are a plan view and an elevational view, respectively, of a transceiver according to a second preferred embodiment of the present invention.
Figure 4B:
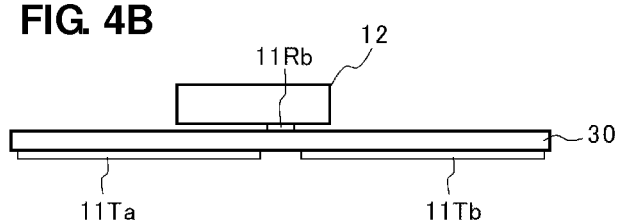

FIGS. 4A and 4B are a plan view and an elevational view, respectively, of a transceiver according to the second preferred embodiment of the present invention. Referring to FIG. 4A, a position at which the matching feeding element 12 is disposed is represented by a two-dot chain line.

In this example, on the undersurface of the rectangular plate-shaped substrate 30, the transmission radiating elements 11Ta and 11Tb are provided. On the top surface of the substrate 30, the receiving radiating elements 11Ra and 11Rb are provided. The transmission radiating elements 11Ta and 11Tb extend in the horizontal, or lateral direction from the center of the substrate 30. The receiving radiating elements 11Ra and 11Rb extend in the vertical, or longitudinal direction from the center of the substrate 30.

The inner end portions of the transmission radiating elements 11Ta and 11Tb are used as the transmission-side feeding points FPt. The inner end portions of the receiving radiating elements 11Ra and 11Rb are used as receiving-side feeding points FPr. The inductors L21 and L22 in the matching feeding element 12 are electromagnetically coupled to the receiving-side feeding points FPr, and the inductors L11 and L12 in the matching feeding element 12 are electromagnetically coupled to the transmission-side feeding points FPt.

Thus, by disposing the transmission radiating elements 11Ta and 11Tb and the receiving radiating elements 11Ra and 11Rb on different surfaces of the substrate, it is possible to suppress and prevent unnecessary coupling around the feeding portions and improve the isolation between a transmission signal and a receiving signal.

Third Preferred Embodiment

Figure 5:
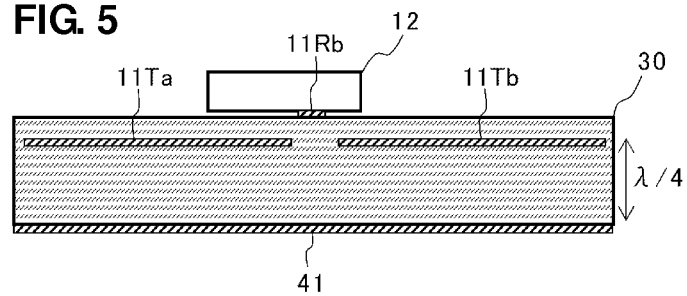
FIG. 5 is a cross-sectional view of a main portion of a transceiver according to a third preferred embodiment of the present invention.

FIG. 5 is a cross-sectional view of a main portion of a transceiver according to the third preferred embodiment of the present invention.

In this example, in the rectangular plate-shaped substrate 30, the transmission radiating elements 11Ta and 11Tb are provided. On the top surface of the substrate 30, the receiving radiating elements are provided. The transmission radiating elements 11Ta and 11Tb extend in the horizontal, or lateral direction from the center of the substrate 30. The receiving radiating elements 11Ra and 11Rb extend in the vertical, or longitudinal direction (the direction perpendicular to the plane of the drawing sheet) from the center of the substrate 30. In FIG. 5, one of these receiving radiating elements, the receiving radiating element 11Rb, is illustrated.

A reflective conductor 41 is disposed in substantially the entire area of the undersurface of the substrate 30. The interval between the reflective conductor 41 and each of the transmission radiating elements 11Ta and 11Tb and the interval between the reflective conductor 41 and each of the receiving radiating elements 11Ra and 11Rb are substantially equal to a quarter of the wavelength at a communication frequency in the substrate. Accordingly, the reflective conductor 41 operates as a reflective element, and the reflective element and the transmission radiating elements 11Ta and 11Tb provide directivity in a direction perpendicular to the substrate 30. Similarly, the reflective element and the receiving radiating elements 11Ra and 11Rb provide directivity in the direction perpendicular to the substrate 30. Therefore, an antenna gain in the direction perpendicular to the substrate 30 can be increased, and radiation in an unnecessary direction can be suppressed and prevented.

That is, it is possible to adjust a communication range in accordance with the application of a radio frequency identification tag reader.

Fourth Preferred Embodiment

Figure 6:
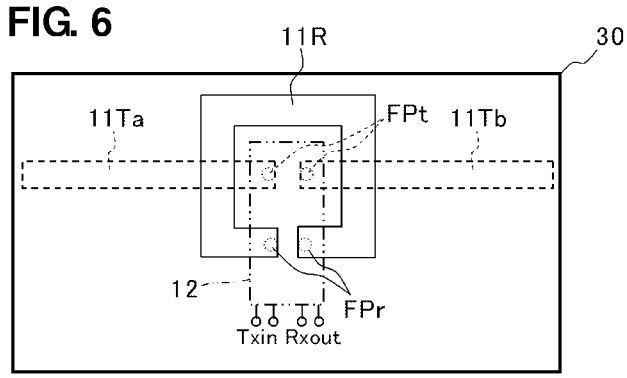
FIG. 6 is a plan view of a transceiver according to a fourth preferred embodiment of the present invention.

FIG. 6 is a plan view of a transceiver according to the fourth preferred embodiment of the present invention.

In this example, on the undersurface of the rectangular plate-shaped substrate 30, the transmission radiating elements 11Ta and 11Tb are provided. On the top surface of the substrate 30, a receiving radiating element 11R is provided. The receiving radiating element 11R has the shape of a rectangular loop. The transmission radiating elements 11Ta and 11Tb extend in the horizontal, or lateral direction from the center of the receiving radiating element 11R.

The inner end portions of the transmission radiating elements 11Ta and 11Tb are used as the transmission-side feeding points FPt. The start and end points of the receiving radiating element 11R are used as the receiving-side feeding points FPr.

The matching feeding element 12 represented by a two-dot chain line is mounted on the top surface of the substrate 30. The inductors in the matching feeding element 12 are electromagnetically coupled to the receiving-side feeding points FPr and the transmission-side feeding points FPt. Thus, the transmission radiating elements 11Ta and 11Tb operate as a dipole antenna, and the receiving radiating element 11R operates as a loop antenna.

The transmission radiating elements 11Ta and 11Tb may be disposed in the substrate 30, for example, at an inner layer thereof.

A loop antenna may be provided with a transmission radiating element, and a dipole antenna may be provided with receiving radiating elements.

Thus, by arranging each of the transmission radiating elements 11Ta and 11Tb and the receiving radiating element 11R orthogonal to each other, isolation between a transmission signal and a receiving signal is achieved.

The directivity of a dipole antenna and the directivity of a loop antenna are different. Accordingly, when different directivity patterns are required without changing the orientations of antennas with respect to the substrate 30, a communication state suitable for application can be obtained using a dipole antenna and a loop antenna.

Fifth Preferred Embodiment

Figure 7A:
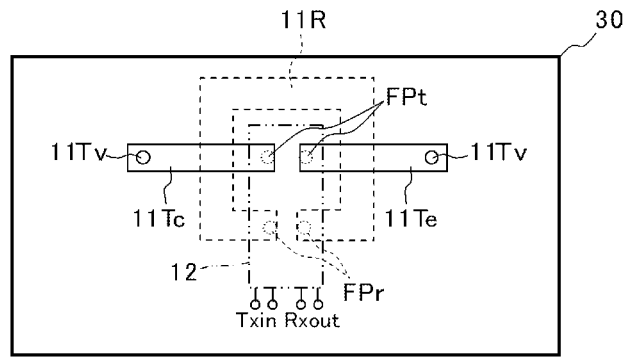
FIGS. 7A and 7B are a plan view and a cross-sectional view, respectively, of a transceiver according to a fifth preferred embodiment of the present invention.
Figure 7B:
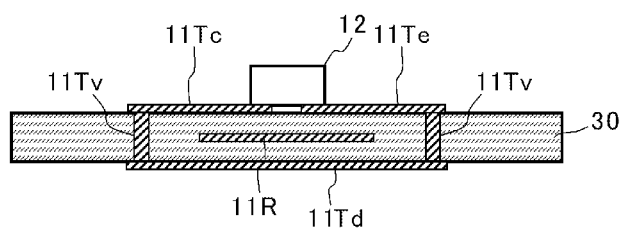

FIGS. 7A and 7B are a plan view and a cross-sectional view, respectively, of a transceiver according to the fifth preferred embodiment of the present invention. Referring to FIG. 7A, a position at which the matching feeding element 12 is disposed is represented by a two-dot chain line.

In this example, the receiving radiating element 11R having the shape of a rectangular loop is provided in the substrate 30, for example, at an inner layer thereof. The receiving radiating element 11R operates as a receiving loop antenna.

On the top surface of the substrate 30, transmission radiating element electrodes 11Tc and 11Te are provided. On the undersurface of the substrate 30, a transmission radiating element electrode 11Td is provided. Transmission radiating element via electrodes 11Tv to connect the transmission radiating element electrodes 11Tc and 11Te on the top surface and the transmission radiating element electrode 11Td on the undersurface are arranged so that the transmission radiating element via electrodes 11Tv pass through the substrate 30 from the top surface to the undersurface.

The transmission radiating element electrodes 11Tc, 11Te, and 11Td and the transmission radiating element via electrodes 11Tv define a transmission loop antenna.

The receiving loop antenna and the transmission loop antenna overlap in plan view, and the loop surfaces thereof are orthogonal or substantially orthogonal to each other. Therefore, the isolation between a transmission signal and a receiving signal can be achieved.

Sixth Preferred Embodiment

Figure 8A:
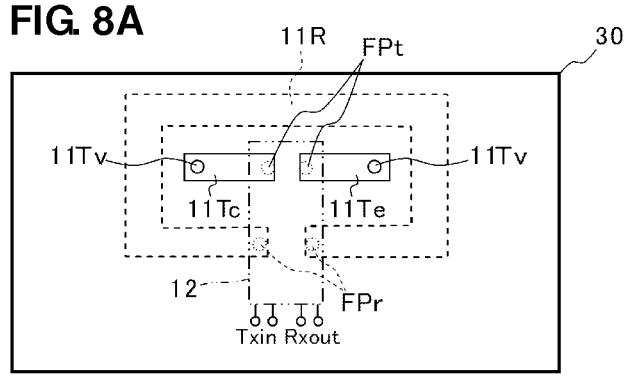
FIGS. 8A and 8B are a plan view and a cross-sectional view, respectively, of a transceiver according to a sixth preferred embodiment of the present invention.
Figure 8B:
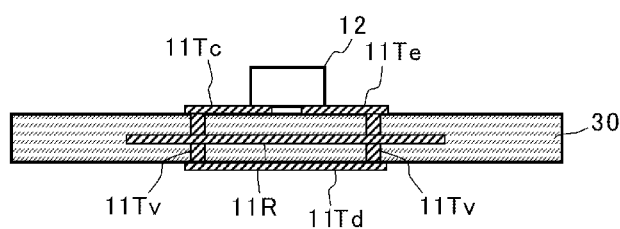

FIGS. 8A and 8B are a plan view and a cross-sectional view, respectively, of a transceiver according to the sixth preferred embodiment of the present invention. Referring to FIG. 8A, a position at which the matching feeding element 12 is disposed is represented by a two-dot chain line.

In the transceiver according to the fifth preferred embodiment illustrated in FIG. 7, the receiving loop antenna defined by the receiving radiating element 11R is inside the transmission loop antenna defined by the transmission radiating element electrodes 11Tc, 11Te, and 11Td and the transmission radiating element via electrodes 11Tv. On the other hand, in the transceiver illustrated in FIG. 8, the transmission loop antenna defined by the transmission radiating element electrodes 11Tc, 11Te, and 11Td and the transmission radiating element via electrodes 11Tv is inside the receiving loop antenna defined by the receiving radiating element 11R. The configuration of this transceiver is preferably the same as that of a transceiver according to the fifth preferred embodiment except for this point.

Seventh Preferred Embodiment

Figure 9:
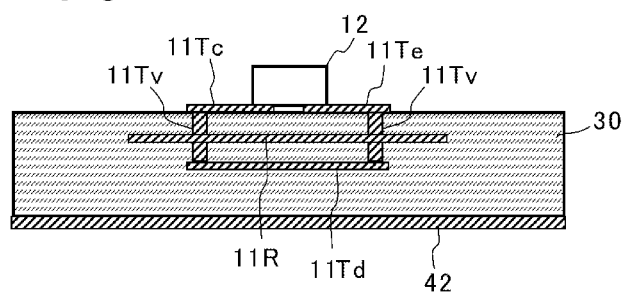
FIG. 9 is a cross-sectional view of a transceiver according to a seventh preferred embodiment of the present invention.

FIG. 9 is a cross-sectional view of a transceiver according to the seventh preferred embodiment of the present invention.

The difference between this transceiver and the transceiver according to the sixth preferred embodiment illustrated in FIG. 8 is that the transmission radiating element electrode 11Td is disposed in the substrate 30 and a magnetic sheet 42 made of ferrite or magnetic metal is provided on the undersurface of the substrate 30. The configuration of this transceiver is preferably the same as the configurations described in the fifth and sixth preferred embodiments except for this difference.

By disposing the magnetic sheet 42, even when a metal body is close to the magnetic sheet 42, no eddy current is generated at the metal body and the reduction in the gains of the loop antennas can be prevented.

Eighth Preferred Embodiment

Figure 10:
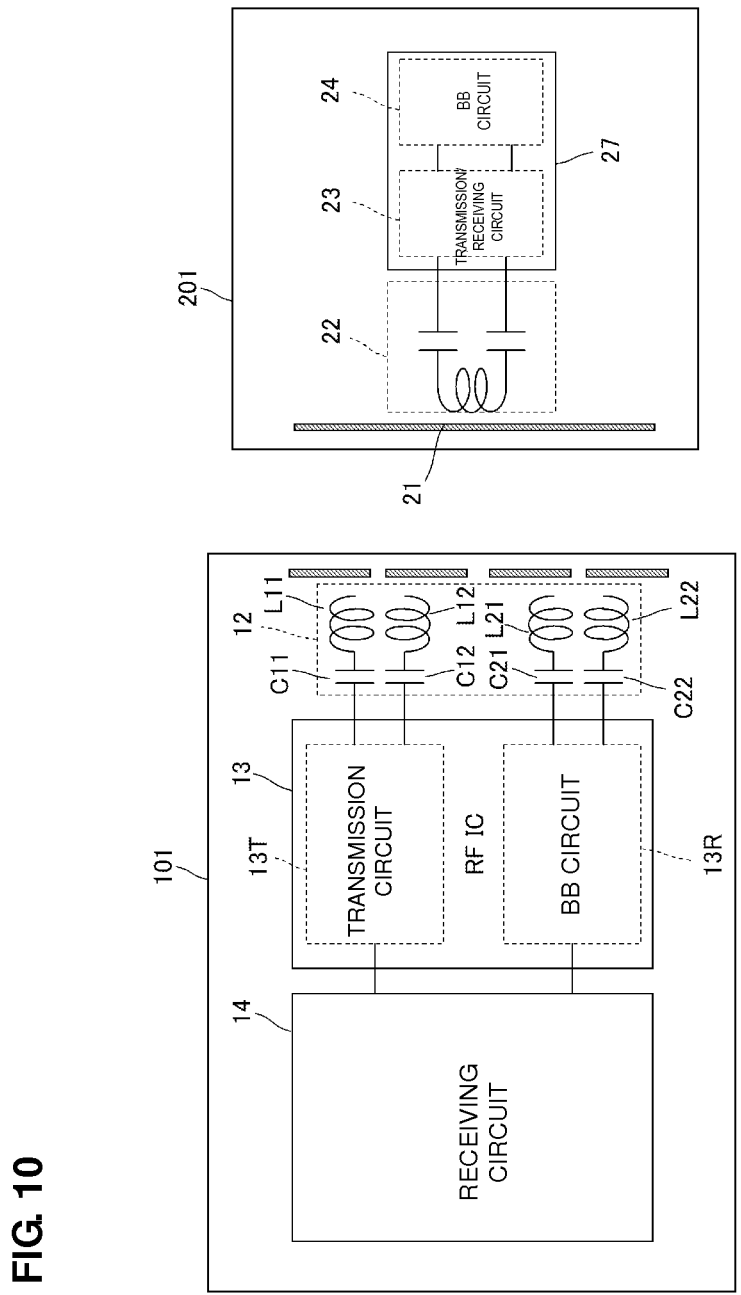
FIG. 10 is a diagram illustrating the configuration of a radio frequency identification tag system according to an eighth preferred embodiment of the present invention.

FIG. 10 is a diagram illustrating the configuration of a radio frequency identification tag system according to the eighth preferred embodiment of the present invention. This radio frequency identification tag system includes the radio frequency identification tag reader 101 described in the first preferred embodiment and a radio frequency identification tag 201. The radio frequency identification tag 201 includes a baseband circuit 24, a transmission/receiving circuit 23, a transmission/receiving feeding circuit 22, and a radiating element 21.

The radio frequency identification tag reader 101 transmits a wave for a preamble, a wave obtained by modulating a command bit stream, and an unmodulated wave in this order. The radio frequency identification tag 201 stores energy required for an initial operation when receiving the wave for a preamble, demodulates the subsequent command bit stream, interprets the demodulated command bit stream, and returns a response with a reflected wave when receiving the unmodulated carrier. The radio frequency identification tag reader 101 reads the response from the radio frequency identification tag 201, demodulates the response, interprets the demodulated response, and performs necessary processing.

In the above-described preferred embodiments, a transmission-side feeding circuit performs both the matching between a radiating element and a transmission circuit and the feeding of power to the radiating element. However, a feeding circuit and a matching circuit may be separately disposed. That is, a feeding circuit electromagnetically coupled to the radiating element may be disposed for a transmission signal, and a matching circuit may be disposed between the feeding circuit and the transmission circuit. Similarly, a feeding circuit electromagnetically coupled to a radiating element may be disposed for a receiving signal, and a matching circuit may be disposed between the feeding circuit and a receiving circuit.

The matching circuit may have various configurations. For example, the matching circuit may include an inductor and a capacitor. Alternatively, the matching circuit may include a single or a plurality of inductors.

The polarization directions of a transmission signal and a receiving signal preferably are orthogonal to each other in the above-described preferred embodiments, but may not necessarily be orthogonal (90°) to each other under the condition that the isolation between a receiving side and a transmission side can be achieved. That is, the polarization directions of a transmission signal and a receiving signal may be substantially orthogonal to each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transceiver comprising:
   a transmission radiating element including a feeding point and arranged to transmit a transmission signal in a first polarization direction;
   a receiving radiating element including a feeding point and arranged to receive a receiving signal in a second polarization direction orthogonal or substantially orthogonal to the first polarization direction;
   a transmission feeding circuit coupled to the feeding point of the transmission radiating element;
   a receiving feeding circuit coupled to the feeding point of the receiving radiating element;
   a transmission circuit configured to supply a transmission signal to the transmission feeding circuit; and
   a receiving circuit configured to receive a receiving signal via the receiving feeding circuit; wherein
   the transmission radiating element and the receiving radiating element are disposed on a surface of a substrate or in an inner layer of the substrate, and arranged in a common plane or in adjacent planes that are parallel or substantially parallel to one another and parallel or substantially parallel to an upper surface of the substrate;
   the transmission radiating element and the receiving radiating element overlap each other in a plan view; and
   the transmission radiating element is fixed so as to transmit the transmission signal while the receiving radiating element is fixed so as to receive the receiving signal.

2. The transceiver according to claim 1, wherein the feeding point of the transmission radiating element and the transmission feeding circuit are electromagnetically coupled to each other, and the feeding point of the receiving radiating element and the receiving feeding circuit are electromagnetically coupled to each other.

3. The transceiver according to claim 1, further comprising a transmission matching circuit connected to the transmission feeding circuit; wherein
   the transmission radiating element, the transmission feeding circuit, and the transmission matching circuit define a transmission antenna apparatus; and
   a frequency band in which a gain of the transmission antenna apparatus is obtained is determined by the transmission matching circuit.

4. The transceiver according to claim 1, further comprising a receiving matching circuit connected to the receiving feeding circuit; wherein
   the receiving radiating element, the receiving feeding circuit, and the receiving matching circuit define a receiving antenna apparatus; and
   a frequency band in which a gain of the receiving antenna apparatus is obtained is determined by the receiving matching circuit.

5. The transceiver according to claim 1, wherein the transmission radiating element and the transmission feeding circuit define a transmission antenna apparatus, and a frequency band in which a gain of the transmission antenna apparatus is obtained is determined by the transmission feeding circuit.

6. The transceiver according to claim 1, wherein the receiving radiating element and the receiving feeding circuit define a receiving antenna apparatus, and a frequency band in which a gain of the receiving antenna apparatus is obtained is determined by the receiving feeding circuit.

7. The transceiver according to claim 1, wherein the transmission radiating element and the receiving radiating element are electric field emission-type radiating elements.

8. The transceiver according to claim 7, wherein the transmission radiating elements define a dipole antenna including two feeding points, and the receiving radiating elements define a dipole antenna including two feeding points, and the transmission radiating elements and the receiving radiating elements are disposed so that the transmission radiating elements and the receiving radiating elements radially extend from the feeding points.

9. The transceiver according to claim 1, wherein one of the transmission radiating element and the receiving radiating element is an electric field emission-type radiating element, and the other one of the transmission radiating element and the receiving radiating element is a magnetic field emission-type radiating element.

10. The transceiver according to claim 1, wherein the transmission radiating element and the receiving radiating element are magnetic field emission-type radiating elements.

11. The transceiver according to claim 10, wherein the transmission radiating element and the receiving radiating element are loop-shaped antennas located at a substrate, and one of the transmission radiating element and the receiving radiating element defines a loop along with a via electrode provided in the substrate.

12. A radio frequency identification tag reader comprising:

the transceiver according to claim 1;
a transmission signal generator configured to generate the transmission signal; and
a receiving signal processor configured to acquire from the receiving signal information about a radio frequency identification tag that is a communication target of the transceiver and includes an integrated circuit to store information and an antenna to transmit information stored in the integrated circuit or to receive information to be stored in the integrated circuit.

13. The transceiver according to claim 1, wherein the transmission radiating element and the receiving radiating element are configured to operate as dipole antennas.

14. The transceiver according to claim 1, wherein one of the transmission radiating element and the receiving radiating element is configured to operate as a dipole antenna, and another of the transmission radiating element and the receiving radiating element is configured to operate as a loop antenna.

15. The transceiver according to claim 1, wherein the transmission radiating element and the receiving radiating element are configured to operate as loop antennas.

* * * * *